US005564716A

United States Patent [19]

Onoue et al.

[11] Patent Number: 5,564,716

[45] Date of Patent: Oct. 15, 1996

[54] RUBBER PLUG FOR WATERPROOF CONNECTOR HAVING AN EXTENSION THAT PROTECTS THE SEAL UPON APPLICATION OF A BENDING FORCE

[75] Inventors: Hisayoshi Onoue; Makoto Takahashi, both of Yokkaichi, Japan

[73] Assignee: Sumitomo Wiring Systems, Ltd., Yokkaichi, Japan

[21] Appl. No.: 327,860

[22] Filed: Oct. 24, 1994

[30] Foreign Application Priority Data

Oct. 26, 1993 [JP] Japan .............................. 5-062559 U

[51] Int. Cl.$^6$ .............................. F16J 15/10; H01R 13/52

[52] U.S. Cl. .............................. 277/209; 277/211; 439/587; 439/589

[58] Field of Search .............................. 277/207 R, 209, 277/211; 439/447, 445, 275, 274, 587, 588, 589, 278, 279, 281, 581, 592, 593, 594, 595, 596

[56] References Cited

U.S. PATENT DOCUMENTS

| | | | |
|---|---|---|---|
| 3,827,704 | 8/1974 | Gillemot et al. | 277/209 |
| 3,905,672 | 9/1975 | Anhalt et al. | 439/589 |
| 4,768,970 | 9/1988 | Nestor | 439/278 |
| 4,895,533 | 1/1990 | Yagi et al. | 439/587 |
| 4,973,266 | 11/1990 | Bullard | 439/589 |
| 5,147,222 | 9/1992 | Hotea et al. . | |
| 5,351,973 | 10/1994 | Taniuchi et al. | 439/587 |
| 5,356,312 | 10/1994 | Abe et al. | 439/278 |

FOREIGN PATENT DOCUMENTS

| | | | |
|---|---|---|---|
| 4414533 | 11/1994 | Germany . | |
| 2130026 | 5/1984 | United Kingdom | 439/588 |

*Primary Examiner*—Scott Cummings
*Attorney, Agent, or Firm*—Oliff & Berridge

[57] ABSTRACT

A rubber plug includes a seal portion and an extension portion. Inner and outer peripheral lips form respective water-tight seals between the rubber plug and a cavity, and the rubber plug and a wire. The extension portion extends from the seal portion toward an open end of the cavity. When a bending force acts on the wire, the extension portion slightly deforms elastically, Put the seal portion will not be deformed. Therefore, the water-tight condition between the cavity and the wire is maintained. Therefore, even when a bending force acts on the wire, water is prevented from intruding into the cavity.

21 Claims, 3 Drawing Sheets

RUBBER PLUG FOR WATERPROOF CONNECTOR HAVING AN EXTENSION THAT PROTECTS THE SEAL UPON APPLICATION OF A BENDING FORCE

BACKGROUND OF THE INVENTION

This invention relates to a rubber plug that is used in a waterproof connector for forming a water-tight seal between a cavity in the connector housing and an electric wire.

One conventional rubber plug is shown in FIG. 4. A rubber plug 30 has a tubular shape as a whole. Annular outer peripheral lips 32 are formed on an outer periphery of the rubber plug, and annular inner peripheral lips 33 are formed on an inner periphery of the rubber plug. The rubber plug 30 is fitted on an electric wire 40 fixedly connected to a rear end portion of a metal terminal 45. The rubber plug is inserted into open end 43, together with the metal terminal 45 and the wire 40, into a cavity 42 of a connector housing 41. When the rubber plug is thus inserted, the outer peripheral lips 32 are pressed against an inner peripheral surface of the cavity 42, so that a water-tight seal is formed between the rubber plug 30 and the inner surface of the cavity 42. Also, the inner peripheral lips 33 are pressed against an outer peripheral surface of the wire 40, so that a water-tight seal is formed between the rubber plug 30 and the wire 40. With this arrangement, water is prevented from intruding into the cavity 42.

Generally, depending on the manner of arranging the wire 40, the wire 40 may be bent laterally at the open end 43 of the cavity 42, as shown in FIG. 5. In such a case, in the above conventional rubber plug 30, a force bending the wire 40 acts on the rubber plug 30, so that the rubber plug 30 is compressed at a region disposed inwardly of this bent portion. Therefore, at the opposite side, that is, at a region disposed outwardly of the bent portion, a gap 44 develops between the outer peripheral lips 32 of the rubber plug 30 and the inner peripheral surface of the cavity 42. This has the undesirable effect of allowing water to enter into the cavity 42. In addition, the wire 40 comes in contact with the sharp edge 50 of the connector, which may cause damage to the wire.

SUMMARY OF THE INVENTION

The present invention has been made in view of the above problems, and an object of the invention is to provide a rubber plug for a waterproof connector in which a waterproof seal is maintained and the rubber plug is protected from damage even when a bending force acts on the electric wire.

According to one aspect of the present invention, there is provided a rubber plug for a waterproof connector wherein the rubber plug and a wire are fitted in a cavity in the waterproof connector. The rubber plug includes a seal portion pressed against the inner surface of the cavity and the wire, and an extension portion extending from the seal portion toward an open end of the cavity, with a gap formed between the extension portion and the inner surface of the cavity. The extension portion may have such a length that it projects outwardly from the open end of the cavity.

According to another aspect of the present invention, there is provided in combination with a waterproof connector having a housing that includes a cavity including an inner surface, a rubber plug that includes a seal portion that contacts the inner surface of the cavity and an exterior surface of a wire that is disposed within the rubber plug, and an extension portion axially offset from the seal portion extending toward an open end of the cavity. A gap is formed between an outer periphery of the extension portion and the exterior surface of the wire when the rubber plug is inserted within the cavity.

According to yet another aspect of the present invention, there is provided a rubber plug for use with a waterproof connector that includes a housing having a cavity, an inner surface, and an open end through which a wire extends, comprising: a rubber body and means for maintaining at least one portion of the rubber body in contact with the inner surface of the cavity, despite bending forces applied to the wire, and for preventing the wire from contacting an edge located near the open end of the cavity.

When a bending force acts on the wire, a portion of the extension portion disposed near the open end of the cavity is pressed by the wire at a region disposed inwardly of the bent portion, so that the portion of the extension portion is pressed against the inner surface of the cavity in a compressed manner, and hence is elastically deformed. The extension portion can be thought of as a protective device for absorbing compression forces. At a region disposed outwardly of the bent portion, the extension portion is elastically deformed away from the inner surface of the cavity. Thus, the only portion which is elastically deformed when the bending force acts on the wire is the extension portion, and the bending force acting on the wire will not act on the seal portion, and therefore the seal portion will not be elastically deformed.

The inner diameter of the cavity is larger than the outer diameter of the extension portion, so a gap is formed between the extension portion and the inner surface of the cavity. Accordingly, when the rubber plug is inserted into the cavity, no frictional resistance will develop between the extension portion and the inner surface of the cavity. In addition, the wire may extend from the end of the extension portion projected outwardly beyond the open end of the cavity, and, therefore, even when a bending force acts on the wire to bend the wire to a large extent, the wire will not engage an edge of the open end of the cavity.

With this construction, the gap is provided between the extension portion, extending toward the open end of the cavity, and the inner surface of the cavity. Therefore, a rubber plug or rubber body is provided for establishing a waterproof connection in which the metal terminal inserting operation will not be affected. Even when a bending force acts on the wire, a waterproof seal is maintained. In addition, deformation of the seal portion is prevented, thus further enhancing the sealing function.

BRIEF DESCRIPTION OF THE DRAWINGS

The invention will be described in detail with reference to the following drawings, wherein.

DETAILED DESCRIPTION OF PREFERRED EMBODIMENTS

A preferred embodiment of the present invention will now be described with reference to FIGS. 1 and 2.

Figure 1:
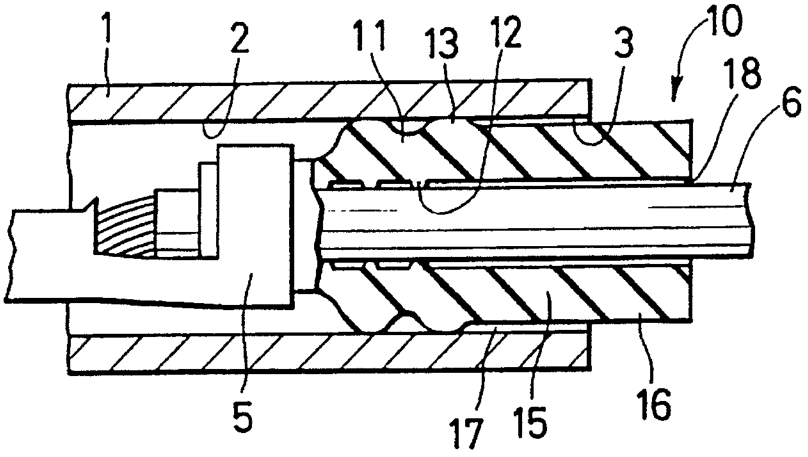
FIG. 1 is a cross-sectional view of a waterproof plug in accordance with a first embodiment of the invention.
Figure 2:
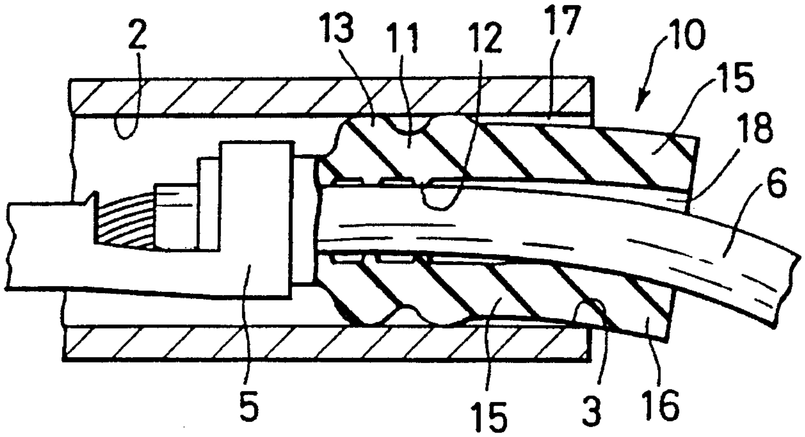
FIG. 2 is a cross-sectional view of the first embodiment, showing a wire in a bent condition.

A cavity 2 in a connector housing 1 of a waterproof connector is shown in cross-section in FIGS. 1 and 2. A metal terminal 5 and an electric wire 6, which are connected to a rear end portion of the metal terminal, are inserted into the cavity 2. A waterproof rubber plug or body 10 is fitted on an outer periphery of that portion of the wire 6 disposed immediately after the position where the wire 6 and the metal terminal 5 are connected together. The rubber plug 10 serves to prevent water from intruding through an open end 3 of the cavity 2, where the metal terminal 5 is located. The rubber plug 10 is fitted on the wire 6, and, in this condition, the rubber plug 10 is inserted, together with the metal terminal 5 and the wire 6, into the cavity 2.

The rubber plug 10 is made of an elastic rubber material, and comprises a seal portion 11 and an extension portion 15.

The seal portion 11 has a tubular shape as a whole, and annular inner peripheral lips 12 are formed in a projected manner on an inner peripheral surface of the seal portion over its entire periphery, and are disposed at two axially-spaced positions, respectively. The inner diameter of the inner peripheral lips 12 is slightly smaller than the outer diameter of the wire 6. When the seal portion 11 is fitted on the wire 6, the inner peripheral lips 12 are elastically deformed and pressed against an outer periphery of a covering of the wire 6, so that a water-tight seal is formed between the inner periphery of the seal portion 11 and the outer periphery of the wire 6.

Annular outer peripheral lips 13 are formed in a projected manner on the outer peripheral surface of the seal portion 11 over its entire periphery, and are disposed at two axially-spaced positions, respectively. The outer diameter of the outer peripheral lips 13 is slightly larger than the inner diameter of the cavity 2. When the seal portion 11 is inserted in the cavity 2, the outer peripheral lips 13 are elastically deformed and pressed against the inner peripheral surface of the cavity 2, so that a water-tight seal is formed between the outer periphery of the seal portion 11 and the inner periphery of the cavity 2.

The extension portion 15 has a tubular shape as a whole, and extends rearwardly from the seal portion 11, that is, toward the open end 3 of the cavity 2 when the rubber plug 10 is inserted in the cavity. The extension portion 15 is formed integrally with the seal portion 11 by molding. The length of the extension portion 15 is dimensioned so that when the rubber plug 10 is inserted in the cavity 2, an extension end portion 16 of the extension portion 15 projects outwardly a predetermined distance from the open end 3 of the cavity 2.

The outer diameter of the extension portion 15 is slightly smaller than the inner diameter of the cavity 2, and when the rubber plug 10 is inserted in the cavity 2, a slight gap 17 is formed between the inner periphery of the cavity 2 and the outer periphery of the extension portion 15. The inner diameter of the extension portion 15 is slightly larger than the outer diameter of the wire 6, and when the rubber plug 10 is fitted on the wire 6, a slight gap 18 is formed between the outer periphery of the wire 6 and the inner periphery of the extension portion 15.

Next, the operation of this first embodiment will be described. When the rubber plug 10 is to be fitted on the wire 6, the wire 6 is passed through the rubber plug 10 against a frictional resistance produced as a result of pressing of the inner peripheral lips 12 of the seal portion 11 against the outer periphery of the wire 6. At this time, because the inner diameter of the extension portion 15 is larger than the outer diameter of the wire 6, a frictional resistance will not develop between the extension portion 15 and the wire 6. Therefore, the frictional resistance is kept to a minimum as a whole, thus reducing the time and labor required for assembly.

The rubber plug 10 is thus fitted on the wire 6, which connects to the metal terminal 5. The rubber plug 10 is forced into the cavity 2, while holding the extension portion 15 by hand. At this time, the assembly is forced into the cavity against the frictional resistance produced as a result of pressing of the outer peripheral lips 13 of the seal portion 11 against the inner periphery of the cavity 2. However, because the outer diameter of the extension portion 15 is smaller than the inner diameter of the cavity 2 to provide the gap 17 therebetween, no frictional resistance develops between the outer periphery of the extension portion 15 and the inner periphery of the cavity 2. Thus, the only source of frictional resistance is the contact between the outer peripheral lips 13 of the seal portion 11 and the inner periphery of the cavity 2. Therefore, the overall frictional resistance is reduced. Therefore, very little time and labor will be required in the inserting operation, and the inserting operation can be carried out quite efficiently.

Moreover, because the extension portion 15 has such a length that it projects from the open end 3 of the cavity 2 when the rubber plug 10 is mounted in position, the inserting operation can be done while holding the extension portion 15 by hand until the metal terminal 5 is inserted into a proper position. Throughout the inserting operation, the wire 6 need not be held by hand for insertion purposes. Therefore, buckling of the wire 6, which could occur when effecting the insertion by holding the wire by hand, is avoided. In addition, the efficiency of the operation is higher than the case where the insertion is effected by holding the wire 6 by hand.

The rubber plug 10 is inserted into the cavity 2, and in this condition, when a bending force acts on the wire 6, a portion of the extension portion 15 disposed at and near the open end 3 of the cavity 2 is pressed by the wire 6 at a region disposed inwardly of the bent portion. Accordingly, the portion of the extension portion 15 is clamped between the edge of the open end 3 of the cavity 2 and the wire 6 to be elastically deformed, as shown in FIG. 2. At a region disposed outwardly of the bent portion, the wire 6 is disengaged from the inner periphery of the extension portion 15, and the extension portion 15 is elastically deformed away from the inner periphery of the cavity 2.

Because the gap 17 between the extension portion 15 and the cavity 2, and the gap 18 between the extension portion 15 and the wire 6 are small, the amount of elastic deformation of the extension portion 15, and the amount of bending of the wire 6 in the extension portion 15 are also small. Therefore, that portion of the wire 6 received in the seal portion 11 only slightly bends. The bending force acting on the wire 6 will not be exerted on the seal portion 11, and the seal portion will not be elastically deformed. Therefore, the condition in which the outer peripheral lips 13 of the seal portion 11 are pressed in contact with the inner periphery of the cavity 2, as well as the condition in which the inner peripheral lips 12 are pressed in contact with the outer periphery of the wire 6, is maintained, and the sealing function is not damaged. Accordingly, water is prevented from entering the cavity 2 from the open end 3 and the metal terminal 5.

Moreover, the wire 6 extends from the extension end portion 16 of the extension portion 15 that projects outwardly from the open end 3 of the cavity 2. Therefore, when a bending force acts on the wire 6, the wire 6 will not engage the edge of the open end 3 of the cavity, thereby avoiding a situation in which the wire 6 engages with and is rubbed by the edge of the open end 3 of the cavity 2 with the result that the covering of the wire 6 is damaged to expose a conductor of the wire.

Figure 3:
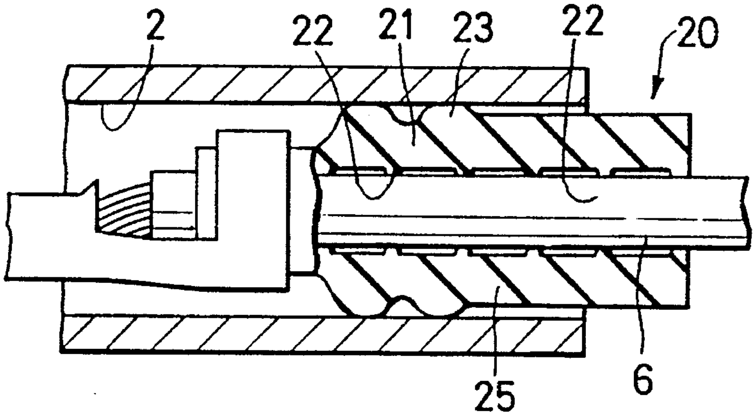
FIG. 3 is a cross-sectional view of a second embodiment.
Figure 4:
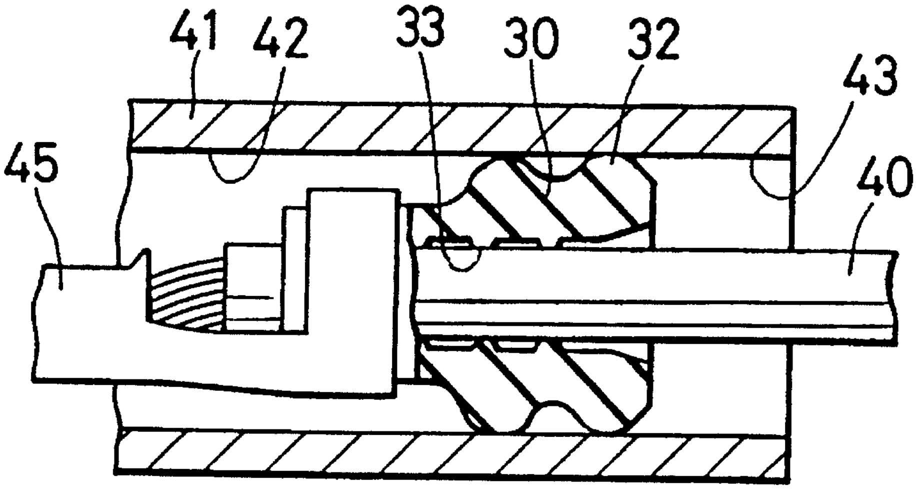
FIG. 4 PRIOR ART
FIG. 4 is a cross-sectional view of a conventional example.
Figure 5:
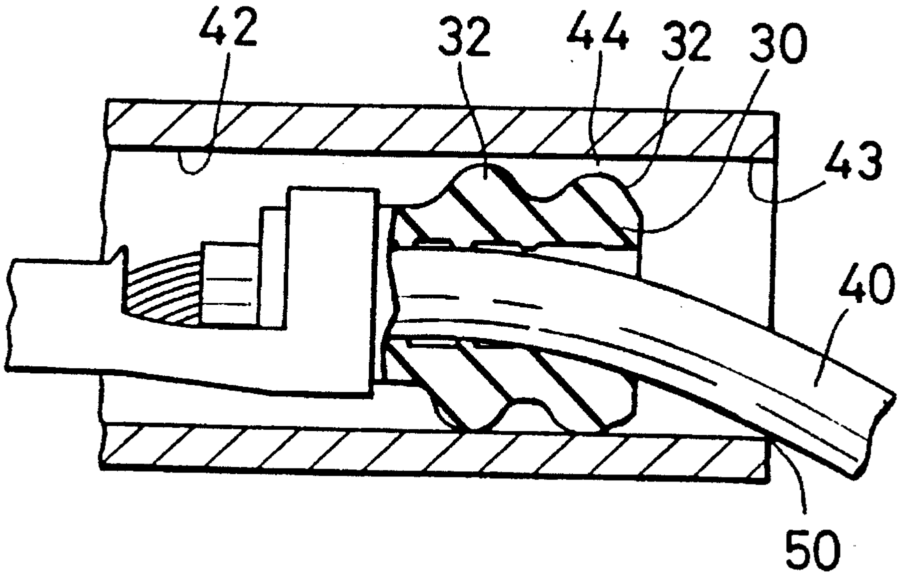
FIG. 5 PRIOR ART
FIG. 5 is a cross-sectional view of the conventional example, showing a wire in a bent condition.

Next, another preferred embodiment of the present invention will be described with reference to FIG. 3.

A rubber plug 20 of the second embodiment comprises a seal portion 21, and an extension portion 25. Outer peripheral lips 23 and inner peripheral lips 22 of the seal portion 21 are pressed against an inner periphery of a cavity 2 and an outer periphery of a wire 6, respectively, thereby maintaining a water-tight sealed condition.

The outer diameter of the extension portion 25 is slightly smaller than the inner diameter of the cavity 2, and the inner diameter of the extension portion is slightly larger than the outer diameter of the wire 6. In this embodiment, as in the seal portion 21, inner peripheral lips 22 are also formed on the inner periphery of the extension portion 25, and the inner peripheral lips 22 of the extension portion 25 are pressed against the outer periphery of the wire 6. Thus, the inner peripheral lips 22 are pressed in contact with the wire 6 at both the seal portion 21 and the extension portion 25. Therefore, when the wire 6 is bent, the close contact between the wire 6 and some of the inner peripheral lips 22 of the extension portion 25 is maintained even at a region disposed outwardly of the bent portion, thus providing a more positive sealing function.

Figure 6:
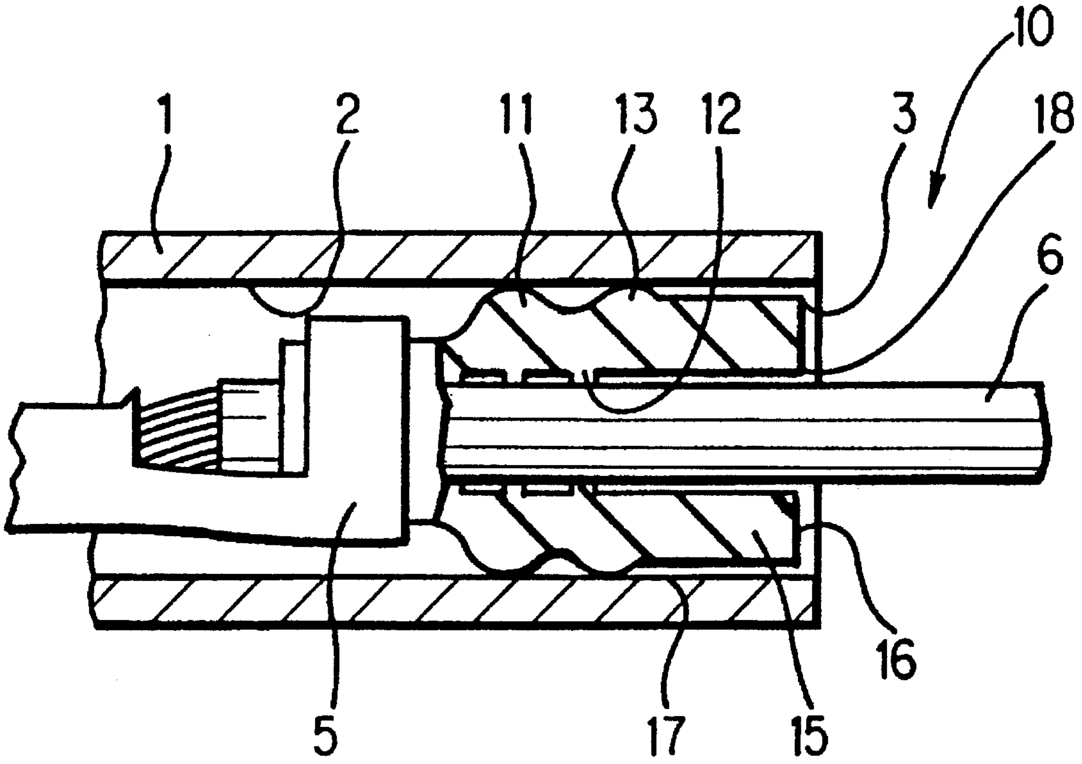
FIG. 6 is a cross sectional view of yet another embodiment of the invention.

Although the extension portion of the rubber plug of either embodiment has such a length that it is projected outwardly from the open end of the cavity, the extension portion can be of such a length that it is totally received within the cavity (FIG. 6). The length of the extension portion need only be long enough to ensure that the bending force of the wire is applied to the extension portion and not to the sealing portion.

The invention has been described in detail with reference to preferred embodiments thereof, which are intended to be illustrative but not limiting. For example, the cavity is defined as having an inner diameter and the extension is defined as having an outer diameter, when the invention is applicable to cavities or extensions of any shape (e.g., square or rectangular) where an inner dimension of the cavity is larger than an outer dimension of the extension. Various changes may be made without departing from the spirit and scope of the invention as defined in the following appended claims.

What is claimed is:

1. A rubber plug for a waterproof connector wherein the rubber plug and a wire are fitted in a cavity of the waterproof connector, comprising:

a seal portion that contacts an inner surface of said cavity and said wire, said cavity having a substantially constant diameter along substantially an entire extent thereof;

an extension portion extending from said seal portion toward an open end of said cavity, and having a length that projects outwardly from the open end of said cavity;

a substantially continuous annular gap formed between said extension portion and the inner surface of said cavity; and wherein a gap is formed between the extension portion and the wire.

2. The rubber plug according to claim 1, wherein said seal portion has an uncompressed diameter that is larger than a diameter of the cavity.

3. The rubber plug of claim 1, wherein a sealing function is provided solely by a size relation between the cavity and the seal portion.

4. In combination with a waterproof connector having a housing that includes a cavity including an inner surface and a substantially constant diameter along substantially an entire extent thereof, a rubber plug comprising:

a seal portion that contacts the inner surface of the cavity and an exterior surface of a wire disposed within the rubber plug; and and extension portion axially offset from the seal portion and extending toward an open end of the cavity, and having a length extending beyond the open end of the cavity;

wherein an inner dimension of the cavity is larger than an outer dimension of the extension portion to define a continuous annular gap between an outer periphery of the extension portion and the inner surface of the cavity when the rubber plug is inserted within the cavity; and wherein an outer dimension of the extension portion is larger than an outer dimension of the wire to define a space between the extension portion and the wire.

5. The rubber plug of claim 4, wherein the seal portion includes interior lips that form a waterproof seal between the wire and an inner portion of the seal portion, and exterior lips that form a waterproof seal between the inner surface of the cavity and an outer portion of the seal portion.

6. The rubber plug of claim 5, wherein the extension portion includes at least one interior lip that forms a waterproof seal between the wire and the interior portion of the extension portion.

7. The rubber plug of claim 6, wherein at least one of the extension portion interior lips and the seal portion interior lips maintain contact with the wire despite application of a bending force to the wire.

8. The rubber plug of claim 4, wherein the extension portion has a length that is configured to prevent the wire from contacting an edge located near the open end of the cavity.

9. The rubber plug of claim 3, wherein the seal includes exterior lips that sealingly engage the inner surface of the cavity, and wherein a bending force applied to the wire will cause the extension portion to contact the inner surface of the cavity thereby enabling said exterior lips of the seal portion to maintain contact with the entire periphery of the inner surface of the cavity to maintain a waterproof seal.

10. The rubber plug of claim 4, wherein the extension portion has a length sufficient to prevent application of wire bending forces to the sealing portion.

11. The rubber plug of claim 4, wherein a sealing function is provided solely by a size relation between the cavity and the seal portion.

12. A rubber plug for use with a waterproof connector that includes a housing having a cavity, an inner surface, and an open end through which a wire extends, comprising a rubber body and protective means for maintaining at least one portion of the rubber body in contact with the inner surface of the cavity, despite bending forces applied to the wire, and for preventing the wire from contacting an edge located near the open end of the cavity, said protective means comprising an extension portion axially offset from the rubber body and extending toward the open end of the cavity and having a length extending beyond the open end of the cavity.

13. The rubber plug of claim 12, wherein the rubber body comprises a seal portion and the protective means comprising said extension portion is axially offset from the seal portion, wherein the extension portion maintains the seal portion in contact with the inner surface of the cavity, despite said bending forces, by absorbing said bending forces with the extension portion rather than said seal portion.

14. The rubber plug of claim 13, wherein the extension portion has a length sufficient to prevent application of wire bending forces to the sealing portion.

15. The rubber plug of claim 12, wherein the rubber body includes a sealing portion that includes exterior lips that contact the inner surface of the cavity, and wherein the protective means includes means for absorbing compressive forces from said exterior lips applied by said bending forces applied to the wire.

16. The rubber plug of claim 15, wherein the means for absorbing includes said extension portion connected to the seal portion, wherein the extension portion makes contact with the inner surface of the cavity to absorb said compressive forces and to prevent the wire from contacting said edge.

17. The rubber plug of claim 16, wherein the extension portion has a length sufficient to prevent application of wire bending forces to the sealing portion.

18. The rubber plug of claim 12, wherein said cavity has a substantially constant diameter along substantially an entire extent thereof.

19. A rubber plug for use with a waterproof connector having a housing that includes a cavity including an inner surface having a substantially constant diameter along substantially an entire axial extent thereof, comprising:

a seal portion that contacts that inner surface of the cavity and an exterior surface of a wire disposed within the rubber plug; and an extension portion axially offset from the seal portion and extending toward an open end of the cavity, said extension portion having a length extending beyond the open end of the cavity sufficient to prevent application of wire bending forces to the seal portion.

20. The rubber plug of claim 19, wherein at least one of the seal portion and the extension portion includes interior lips that maintain contact with the wire.

21. The rubber plug of claim 19, wherein a sealing function is provided solely by a size relation between the cavity and the seal portion.

* * * * *